(12) United States Patent
Liu et al.

(10) Patent No.: US 9,231,659 B2
(45) Date of Patent: Jan. 5, 2016

(54) POWER LINE COMMUNICATION DEVICE WITH NOISE DETECTING AND FILTERING FUNCTIONS

(71) Applicant: D-Link Corporation, Taipei (TW)

(72) Inventors: Ming-Han Liu, Taipei (TW); Wei-Chung Hsu, Taipei (TW); Jun-Hao Huang, Taipei (TW)

(73) Assignee: D-LINK CORPORATION, Taipei (TW)

(*) Notice: Subject to any disclaimer, the term of this patent is extended or adjusted under 35 U.S.C. 154(b) by 7 days.

(21) Appl. No.: 14/212,539

(22) Filed: Mar. 14, 2014

(65) Prior Publication Data

US 2015/0124889 A1 May 7, 2015

(30) Foreign Application Priority Data

Nov. 6, 2013 (TW) .............................. 102140237 A

(51) Int. Cl.
*H04B 3/56* (2006.01)
*H04B 3/54* (2006.01)

(52) U.S. Cl.
CPC ... *H04B 3/56* (2013.01); *H04B 3/54* (2013.01)

(58) Field of Classification Search
CPC .... H04B 3/54; H04B 3/56; H04B 2203/5483; H05B 37/0263

USPC .............. 375/257, 258; 370/485; 340/310.11, 340/538

See application file for complete search history.

(56) References Cited

U.S. PATENT DOCUMENTS

| 8,040,235 | B2* | 10/2011 | Koga ....................... | H04B 3/54 |
| | | | | 340/538 |
| 2009/0102618 | A1* | 4/2009 | Iwai ........................ | H02J 9/062 |
| | | | | 340/538 |
| 2012/0092141 | A1* | 4/2012 | Ichihara ................... | H04B 3/54 |
| | | | | 340/12.32 |

* cited by examiner

*Primary Examiner* — Daniel Washburn
*Assistant Examiner* — Eboni Hughes
(74) *Attorney, Agent, or Firm* — Bacon & Thomas, PLLC

(57) ABSTRACT

The present invention is to provide a PLC device having noise detecting and filtering functions, which includes a power receiving port having one end connected to a power supply unit for receiving a power signal and a network signal; a noise filtering circuit having one end connected to the other end of the power receiving port for filtering noise of the power signal passing therethrough; a power output port connected between the other end of the noise filtering circuit and a load; a noise detecting circuit having two ends connected to a line between the first filtering unit and power receiving port and a line between the first filtering unit and power output port, respectively; and a processing unit connected to a line between the first filtering unit and power receiving port for receiving the network signal from the noise detecting circuit and transmitting the same to a network apparatus.

4 Claims, 3 Drawing Sheets

POWER LINE COMMUNICATION DEVICE WITH NOISE DETECTING AND FILTERING FUNCTIONS

FIELD OF THE INVENTION

The present invention relates to a PLC (Power Line Communication) device, more particularly to a PLC device having a noise detecting circuit capable of blocking a power signal from passing therethrough, but allowing a network signal to pass therethrough. Thus, a low current resistant relay may be used in the noise detecting circuit when designing and manufacturing the PLC device, as a way to effectively reduce product size and production cost and thereby substantially enhance product competitiveness

BACKGROUND OF THE INVENTION

With the increasingly extensive use of network technologies, a great variety of networking devices have been developed to suit user needs. For example, one who needs frequent use of broadband services may require an Asymmetric Digital Subscriber Line (ADSL) modem coupled to a central office (CO) line or a cable modem coupled to a TV signal cable in order to make Internet connection. As wireless network technologies gradually mature, cable-based broadband Internet connection has given way to the wireless version by degrees, not only because the latter can be implemented with far less cables than required in the former, but also because one who has made such wireless connection through an electronic device is allowed to move about freely. However, despite the huge convenience it brings to network applications, wireless broadband Internet connection has such drawbacks as low data security and high susceptibility to interruption. To overcome these drawbacks while maintaining the advantage of not requiring additional network cables, the power line communication (PLC) technology was devised and is now available for use. Generally speaking, a power line networking device is advantageous over modems and like networking devices in that it does not require extra cabling, provides wide network coverage, allows easy connection, and has high data rate. In fact, a power line networking device relies on no more than a household power line to make broadband Internet connection. Therefore, a client end only has to plug a power line networking device into a wall socket, and broadband Internet connection can be established directly through the power line; in other words, there is no need for a broadband network service provider to install additional wires at the client end.

As its name suggests, power line communication uses existing power lines in a building to transmit network signals. In order to apply PLC technology, PLC devices (e.g., network bridges) are required, which are connected to power line sockets at different locations to convert network signals and thereby enable transmission of network signals via power lines. Now that power lines are essential to each building, using power lines as the backbone medium for network transmission not only spares the trouble of cable distribution, but also reduces the cost and time of installation. Also, the integrity of the interior design of a building need not be compromised. In a nutshell, PLC is an ideal solution to the aforesaid problems. However, as a power line is designed solely as a power-supplying medium in the first place and is not configured for high-quality signal transmission, the voltage carried by a power line will fluctuate with the load of the electronic device being powered or even generate electromagnetic radiation. The electronic device being powered may also generate noise. All the foregoing interferes with network signals. A minor interference can lower the quality of network signal transmission; a significant interference, on the other hand, can damage network signals completely. One solution to the noise interference problem is to install a filter in a PLC device, so as for the filter to filter out noise in the power line. Nevertheless, since not all electronic devices generate a high level of noise, one who has bought a PLC device equipped with a filter can never know if the filter provides the expected filtering effect, or which electronic device should the PLC device be connected to in order to filter out the strongest source of noise.

To effectively solve the problems stated above, the inventor of the present invention developed a PLC device switchable between noise detecting and filtering functions. This PLC device, as shown in FIG. 1, not only can effectively detect noise generated by various electronic devices, but also can filter out the noise detected, thereby increasing the quality of a network environment. Referring to FIG. 1, the PLC device 1 includes a power receiving port 11, a filtering unit 12, a power output port 13, a switching unit 14, and a processing unit 15. The power receiving port 11 has one end connected to a power supply unit 10 in order to receive a power signal transmitted from the power supply unit 10 and a network signal carried by the power signal. The filtering unit 12 has a first end connected to the opposite end of the power receiving port 11. The switching unit 14 includes a first connecting end A1, a second connecting end A2, and a control end A0. The first connecting end A1 is connected to the first end of the filtering unit 12, the second connecting end A2 is connected to a second end of the filtering unit 12, and the control end A0 is switchable into conduction with only the first connecting end A1 or only the second connecting end A2. The power output port 13 has one end connected to the control end A0 and the opposite end connected to a load L. The processing unit 15 is connected to the first end of the filtering unit 12 and includes a bridge module 151, a detection module 152, and a display module 153. Once the control end A0 is switched into conduction with the first connecting end A1, the bridge module 151 receives the network signal transmitted from the power receiving port 11. Once the control end A0 of the switching unit 14 is switched into conduction with the second connecting end A2 instead, the filtering unit 12 can filter out the noise generated in the power signal by the load L.

More specifically, in the state in which the control end A0 has been switched into conduction with the first connecting end A1, both the power output port 13 and the processing unit 15 are connected to the first end of the filtering unit 12 such that the filtering unit 12 is unable to filter out the noise generated by the load L. The detection module 152 in this state receives the power signal from the load end, detects the level of the noise generated in the power signal by the load L, and shows the current noise level. Conversely, in the state in which the control end A0 of the switching unit 14 has been switched into conduction with the second connecting end A2, the power output port 13 and the processing unit 15 are connected via the filtering unit 12, thus allowing the filtering unit 12 to filter out the noise generated in the power signal by the load L. Therefore, after receiving the power signal transmitted from the power receiving port 11, the bridge module 151 can correctly obtain, by conversion, the network signal carried by the power signal and then delivers the network signal to an external network apparatus either through a physical connecting line or wirelessly. When it is desired to lay out a power line network in a place where there are a plurality of electronic apparatuses, the control end A0 of the switching unit 14 can be switched into connection with the second connecting end A2, and then the PLC device 1 is sequentially connected to each electronic apparatus. By doing so, the level of the noise generated by each electronic apparatus during operation can be known. The PLC device 1 is eventually applied to the electronic apparatus generating the highest level of noise, with the control end A0 switched into connection with the first connecting end A1 in order to filter out the strongest source of noise in that place.

The PLC device 1 described above can effectively enhance noise filtering, thus greatly increasing the practical value of the conventional PLC devices in general. However, as the PLC device 1 is so designed as to allow passage of the power signal and the network signal (and the noise generated in the power signal by the load L), the switching unit 14 must be a high current resistant element if the path of the power signal and the network signal is controlled solely by the switching unit 14; otherwise, the switching unit 14 cannot withstand the high current of the power signal. Generally speaking, high current resistant elements are both costly and bulky. Using a high current resistant element as the switching unit 14 not only raises the production cost of the PLC device 1, but also hinders product miniaturization.

Hence, while the inventor of the present invention has devised a practical PLC device featuring excellent performance in application, the spirit of constant pursuit of perfection has driven the inventor to make further efforts and improve the existing design from the perspective of production. The issue to be addressed by the present invention is to bring about PLC device optimization and enable the foregoing PLC device 1 to use a low current resistant element as the switching unit 14, thereby effectively downsize the finished product and greatly reduce production cost.

BRIEF SUMMARY OF THE INVENTION

In view of the production-related problems of the conventional PLC devices such as high production cost and difficulties in miniaturization, the inventor of the present invention incorporated years of practical experience in the related industry into repeated trials and adjustments and finally succeeded in developing a PLC device with noise detecting and filtering functions as disclosed herein. The present invention is intended to solve all the aforesaid problems of the conventional PLC devices at once.

It is an object of the present invention to provide a PLC device having noise detecting and filtering functions, wherein the PLC device includes a power receiving port (e.g., a plug), a noise filtering circuit, a power output port (e.g., a socket), a noise detecting circuit, and a processing unit. The power receiving port has one end connected to a power supply unit (e.g., a power socket in a power line network) in order to receive a power signal and a network signal. The noise filtering circuit has one end connected to the other end of the power receiving port and is provided with a first filtering unit through which the power signal can pass. The power output port has one end connected to the other end of the noise filtering circuit while the other end of the power output port is connected to a load (e.g., an electric fan, a hair blower, a computer, or other electronic devices). The noise detecting circuit has one end connected to a line between the first filtering unit and the power receiving port. The other end of the noise detecting circuit is connected to a line between the first filtering unit and the power output port. The noise detecting circuit is provided with a relay and a second filtering unit. When the relay is closed, the network signal and a noise generated in the power signal by the load can pass through the noise detecting circuit, and yet the power signal is kept by the second filtering unit from passing through the same path. The processing unit is connected to the line between the first filtering unit and the power receiving port. The processing unit is provided therein with a bridge module and a detection module. The bridge module of the processing unit is configured for receiving the network signal and transmitting the network signal to a network apparatus. When the relay is opened, the network signal is ensured against interference of the noise and is therefore error-free because the first filtering unit has filtered out the noise generated in the power signal by the load. Conversely, when the relay is closed, the noise is transmitted to the processing unit through the noise detecting circuit in order for the detection module to detect the level of the noise. A user may first plug the PLC device into the power supply unit so that the power signal is transmitted to the load and the network signal, to the network apparatus. Then, the relay is switched to the closed state in order for the detection module to determine if the load generates excessive noise. After that, the user may switch the relay to the opened state, allowing the first filtering unit to filter out the noise generated by the load, thereby ensuring the quality and stability of the network signal during transmission. It is worth mentioning that the second filtering unit serves to block the power signal from passing through the noise detecting circuit. Therefore, even when the user switches the relay to the closed state to detect the noise generated by the load, the power signal is prevented from passing through the noise detecting circuit. And because of that, a low current resistant relay may be used when designing and manufacturing the PLC device, as a way to effectively reduce product size and production cost and thereby substantially enhance product competitiveness.

Another object of the present invention is to provide a PLC device having noise detecting and filtering functions as described below. The PLC device includes a power receiving port, a noise filtering circuit, a power output port, a noise detecting circuit, and a processing unit. The power receiving port has one end connected to a power supply unit in order to receive a power signal and a network signal. The noise filtering circuit has one end connected to the other end of the power receiving port and is provided with a filtering unit through which the power signal can pass. The power output port has one end connected to the other end of the noise filtering circuit while the other end of the power output port is connected to a load. The noise detecting circuit has one end connected to a line between the filtering unit and the power receiving port. The other end of the noise detecting circuit is connected to a line between the filtering unit and the power output port. The noise detecting circuit is provided with a relay and a coupling transformer. When the relay is closed, the coupling transformer isolates the power signal and thereby prevents the high current of the power signal from entering the relay; in the meantime, the coupling transformer induces to the noise detecting circuit a noise generated in the power signal by the load. The processing unit is connected to the line between the filtering unit and the power receiving port. The processing unit is provided therein with a bridge module and a detection module. The bridge module of the processing unit is configured for receiving the network signal and transmitting the network signal to a network apparatus. When the relay is opened, the network signal is ensured against interference of the noise and is therefore error-free because the filtering unit has filtered out the noise generated in the power signal by the load. Conversely, when the relay is closed, the noise is transmitted to the processing unit through the noise detecting circuit in order for the detection module to detect the level of the noise. With the coupling transformer isolating the power signal from the noise detecting circuit and inducing the noise to the noise detecting circuit, the goal of "separating the noise from the power signal and guiding them to different paths respectively" is equally achieved. Hence, a low current resistant relay may be used when designing and manufacturing the PLC device to effectively reduce product size and production cost, thereby greatly enhancing product competitiveness.

BRIEF DESCRIPTION OF THE SEVERAL VIEWS OF THE DRAWINGS

The technique, structural features, and other objects of the present invention will be best understood by referring to the following detailed description of some illustrative embodiments in conjunction with the accompanying drawings, in which.

DETAILED DESCRIPTION OF THE INVENTION

Figure 1:
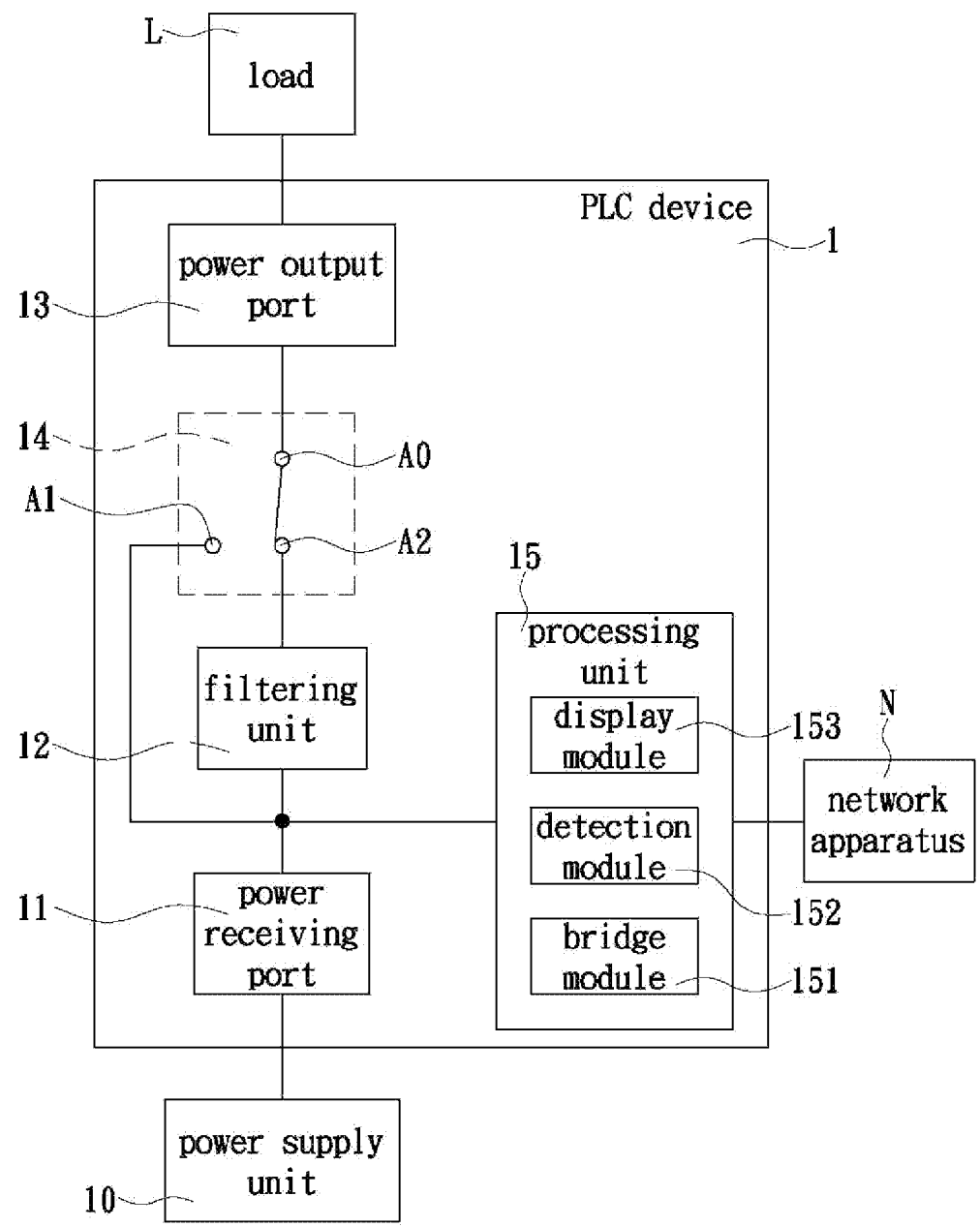
FIG. 1 schematically shows a conventional PLC device.

The present invention discloses a PLC device with noise detecting and filtering functions. Please refer to FIG. 2 for a schematic drawing of the first preferred embodiment of the present invention. The PLC device 2 includes a power receiving port 21 (e.g., a plug), a noise filtering circuit 22, a power output port 23 (e.g., a socket), a noise detecting circuit 24, and a processing unit 25. In the first preferred embodiment, the power receiving port 21 has one end connected to a power supply unit 10 (e.g., a power socket in a power line network) so as to receive a power signal and a network signal. To facilitate description of the principles of the present invention and to demonstrate the effects of the invention with a simple example, it is assumed that the frequency of the power signal is 60 Hz and the frequency of the network signal is 30 Hz. In practice, the power signal and the network signal are not subject to the above frequency conditions.

As stated above, the PLC device 2 of the present invention has two transmission paths, whose technical features are detailed as follows. The noise filtering circuit 22 has one end connected to the opposite end of the power receiving port 21 and is provided with a first filtering unit 221. In the first preferred embodiment, the first filtering unit 221 is a high-pass filter which allows passage of signals of 45 Hz and above, so the first filtering unit 221 allows passage of the power signal (60 Hz). The power output port 23 has one end connected to the opposite end of the noise filtering circuit 22, and the opposite end of the power output port 23 is connected to a load L (e.g., an electronic device such as an electric fan, a hair blower, or a computer). As the first filtering unit 221 allows passage of the power signal, the power signal can be transmitted from the power supply unit 10 to the load L through the power receiving port 21, the noise filtering circuit 22, and the power output port 23 in order to drive the load L. When in operation, the load L generates a noise in the power signal, wherein the noise has the same frequency as the network signal (i.e., 30 Hz) for example.

Figure 2:
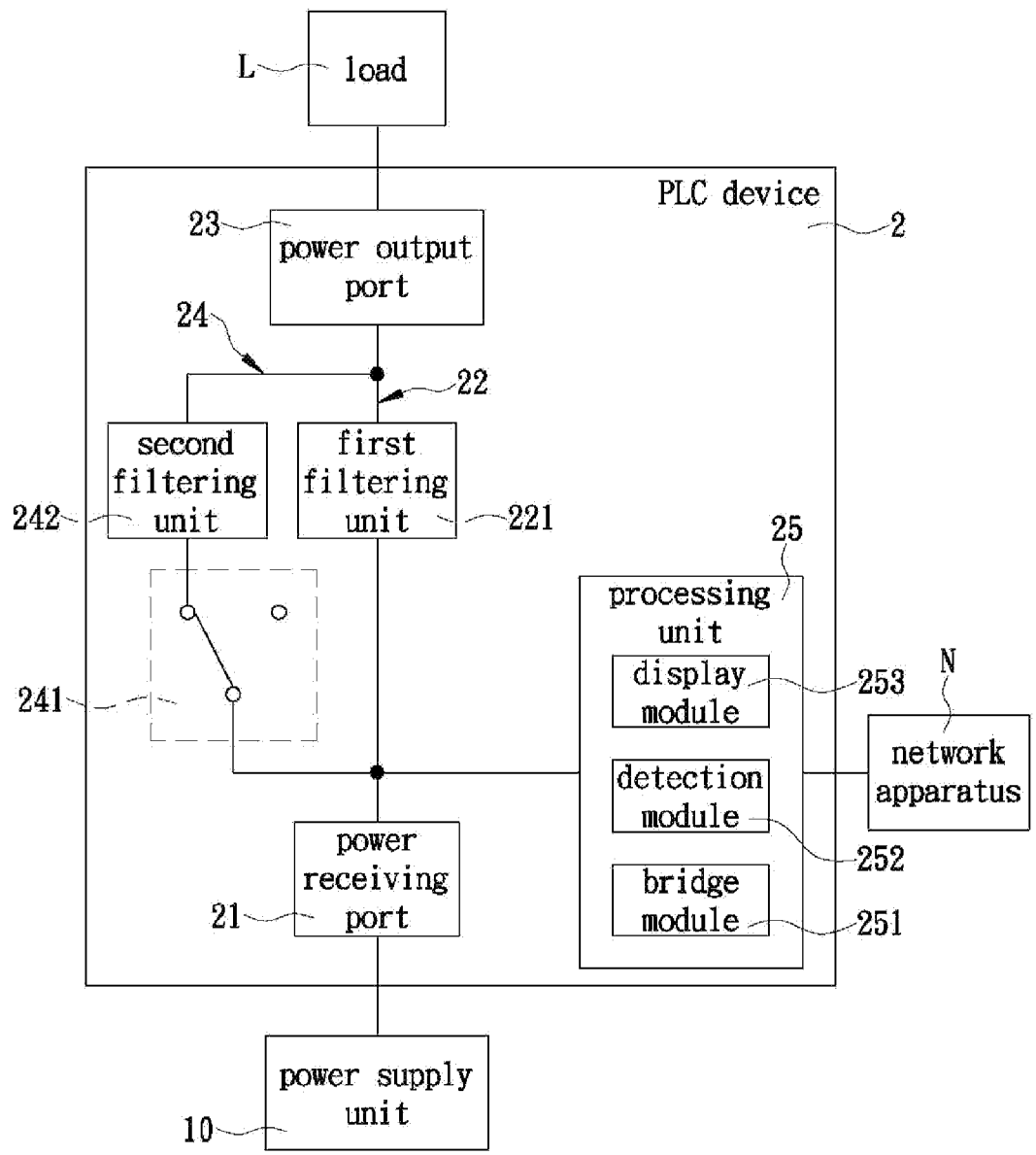
FIG. 2 schematically shows the PLC device according to the first preferred embodiment of the present invention.

With continued reference to FIG. 2, the noise detecting circuit 24 has one end connected to a line between the first filtering unit 221 and the power receiving port 21. The opposite end of the noise detecting circuit 24 is connected to a line between the first filtering unit 221 and the power output port 23. The noise detecting circuit 24 is provided with a relay 241 and a second filtering unit 242. In the first preferred embodiment, the second filtering unit 242 is a low-pass filter which allows passage of signals of 40 Hz and below. Therefore, the second filtering unit 242 allows passage of the noise (30 Hz) but does not allow passage of the power signal (60 Hz).

Figure 3:
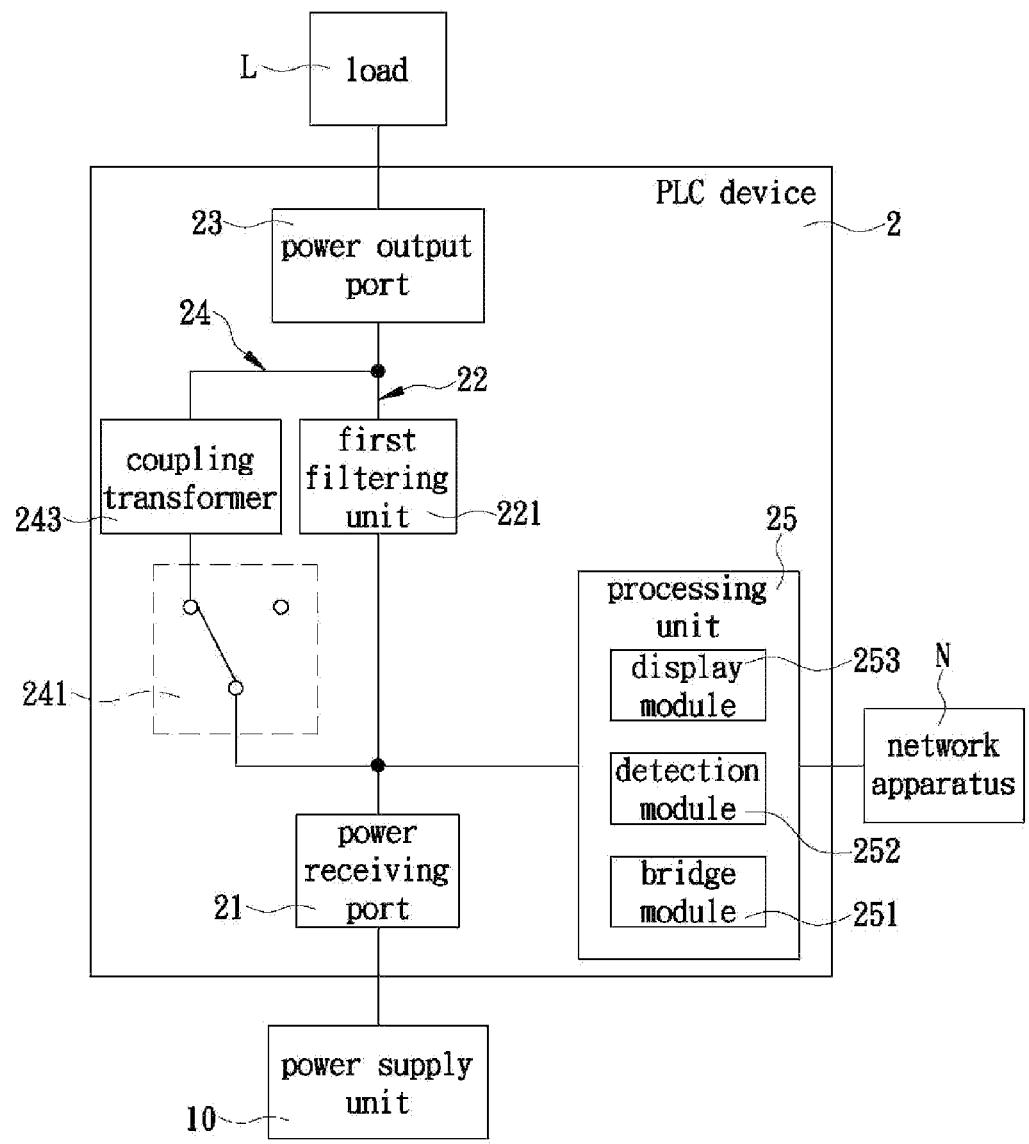
FIG. 3 schematically shows the PLC device according to the second preferred embodiment of the present invention.

Operations of the noise filtering circuit 22 and the noise detecting circuit 24 are described below. The power signal can be transmitted to the load L through the noise filtering circuit 22 but cannot pass through the second filtering unit 242. Consequently, even if the relay 241 is closed, the power signal cannot flow through the noise detecting circuit 24. On the other hand, the load L, when driven by the power signal, generates the noise in the power signal. If the relay 241 is closed while the load L is in operation, the noise will pass through the noise detecting circuit 24. Conversely, if the relay 241 is opened while the load L is in operation, the noise can pass through neither the noise detecting circuit 24 (which is an open circuit) nor the noise filtering circuit 22 (for the noise cannot pass through the first filtering unit 221). Thus, with the first filtering unit 221 in the noise filtering circuit 22 and the second filtering unit 242 in the noise detecting circuit 24, the power signal and the noise are effectively separated and respectively guided to different paths. It should be noted that the first filtering unit 221 is not necessarily a high-pass filter and the second filtering unit 242 is not necessarily a low-pass filter. In practice, band-pass filters may be used instead. For example, a band-pass filter with a passband between 45 and 80 Hz may be used as the first filtering unit 221, and/or a band-pass filter with a passband between 15 and 40 Hz may be used as the second filtering unit 242. Further, referring to FIG. 3 for the second preferred embodiment of the present invention, a coupling transformer 243 is used in place of the second filtering unit 242 shown in FIG. 2. The coupling transformer 243 serves to keep the power signal from entering the noise detecting circuit 24 and induce the noise generated in the power signal by the load L to the noise detecting circuit 24, thereby separating the noise from the power signal and guiding them to different paths respectively. Thus, the intended effects of the present invention are equally achieved. The core technique of the present invention, therefore, lies in dividing the power signal and the noise and directing them respectively into different paths. All changes or modifications which are based on the disclosure of the present invention and easily conceivable by a person skilled in the art do not depart from the scope of the present invention.

Referring back to FIG. 2, in the first preferred embodiment, the processing unit 25 is connected to the line between the first filtering unit 221 and the power receiving port 21. The processing unit 25 is provided therein with a bridge module 251, a detection module 252, and a display module 253. The bridge module 251 is configured to receive the network signal transmitted from the power receiving port 21 and send the network signal to a network apparatus N either via a physical connecting line or wirelessly. When the relay 241 is in the closed state, in which the noise can pass through the noise detecting circuit 24, the noise is transmitted to the processing unit 25 in order for the detection module 252 to detect the level of the noise. In the first preferred embodiment, the processing unit 25 can display on the display module 253 the noise level detected by the detection module 252. When the relay 241 is in the opened state, in which the noise cannot pass through the noise detecting circuit 24, the network signal is kept from interference of the noise generated by the load L; as a result, the correctness of the network signal is ensured.

According to the above description, a user who has connected the PLC device 2 to the power supply unit 10 to deliver the power signal to the load L and the network signal to the network apparatus N may first switch the relay 241 to the closed state so as for the detection module 252 to determine if the load L generates excessive noise. Afterward, the user may switch the relay 241 to the opened state so that the noise generated by the load L is filtered out by the first filtering unit 221 to ensure the quality and stability of the network signal during transmission. More importantly, as the second filtering unit 242 will stop the power signal from passing through the noise detecting circuit 24, the power signal will not pass through the noise detecting circuit 24 even when the user switches the relay 241 to the closed state to detect the noise generated by the load L. Consequently, one who designs or manufactures the PLC device 2 may use a low current resistant element as the relay 241 to effectively downsize the final product, substantially lower production cost, and thereby greatly enhance the competiveness of the product.

While the invention herein disclosed has been described by means of specific embodiments, numerous modifications and variations could be made thereto by those skilled in the art without departing from the scope of the invention set forth in the claims.

What is claimed is:

1. A power line communication (PLC) device with noise detecting and filtering functions, comprising:
    a power receiving port having an end connected to a power supply unit in order to receive a power signal and a network signal from the power supply unit;
    a first filtering unit having an end connected to an opposite end of the power receiving port, wherein the first filtering unit is a high-pass filter configured for blocking passage of the network signal but allowing passage of the power signal;
    a power output port having an end connected to an opposite end of the first filtering unit and an opposite end connected to a load, for transmitting the power signal passing through the first filtering unit to the load;
    a second filtering unit having an end connected to a line between the first filtering unit and the power output port, wherein the second filtering unit is a low-pass filter configured for blocking passage of the power signal but allowing passage of a noise generated in the power signal by the load;
    a relay having an end connected to an opposite end of the second filtering unit and an opposite end connected to a line between the first filtering unit and the power receiving port, wherein the relay is configured to be switched to a closed state for connecting the second filtering unit with the line between the first filtering unit and the power receiving port, or switched to an open state for disconnecting the second filtering unit with the line between the first filtering unit and the power receiving port; and
    a processing unit connected to the line between the first filtering unit and the power receiving port, the processing unit being provided therein with a bridge module and a detection module, the bridge module of the processing unit being configured for receiving the network signal and transmitting the network signal to a network apparatus, the detection module of the processing unit being configured for detecting a level of the noise passing through the second filtering unit when the relay is in the closed state.

2. The PLC device of claim 1, wherein the processing unit further comprises a display module connected to the detection module so that the detection module, upon detecting the level of the noise generated in the power signal by the load, can display a detection result through the display module.

3. A power line communication (PLC) device with noise detecting and filtering functions, comprising:
    a power receiving port having an end connected to a power supply unit in order to receive a power signal and a network signal from the power supply unit;
    a first filtering unit having an end connected to an opposite end of the power receiving port, wherein the filtering unit is a high-pass filter configured for blocking passage of the network signal but allowing passage of the power signal;
    a power output port having an end connected to an opposite end of the first filtering unit and an opposite end connected to a load, for transmitting the power signal passing through the first filtering unit to the load;
    a coupling transformer having an end connected to a line between the filtering unit and the power output port, wherein, the coupling transformer isolates and prevent the power signal from passing therethrough, but induces a noise generated in the power signal by the load;
    a relay having an end connected to an opposite end of the coupling transformer and an opposite end connected to a line between the first filtering unit and the power receiving port, wherein the relay is configured to be switched to a closed state for connecting the coupling transformer with the line between the first filtering unit and the power receiving port, or switched to an open state for disconnecting the coupling transformer with the line between the first filtering unit and the power receiving port; and
    a processing unit connected to the line between the filtering unit and the power receiving port, the processing unit being provided therein with a bridge module and a detection module, the bridge module of the processing unit being configured for receiving the network signal and transmitting the network signal to a network apparatus, the detection module of the processing unit being configured for detecting a level of the noise induced by the coupling transformer when the relay is in the closed state.

4. The PLC device of claim 3, wherein the processing unit further comprises a display module connected to the detection module so that the detection module, upon detecting the level of the noise generated in the power signal by the load, can display a detection result through the display module.

* * * * *